(12) United States Patent
Shintomi

(10) Patent No.: US 10,567,117 B2
(45) Date of Patent: Feb. 18, 2020

(54) TRANSFER DEVICE

(71) Applicant: Murata Manufacturing Co., Ltd., Kyoto (JP)

(72) Inventor: Yuji Shintomi, Kyoto (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 0 days.

(21) Appl. No.: 16/003,453

(22) Filed: Jun. 8, 2018

(65) Prior Publication Data

US 2018/0359055 A1    Dec. 13, 2018

(30) Foreign Application Priority Data

Jun. 12, 2017    (JP) ................. 2017-114895

(51) Int. Cl.
*G06F 11/00* (2006.01)
*H03M 13/00* (2006.01)
*H04L 1/00* (2006.01)
*G06F 13/16* (2006.01)

(52) U.S. Cl.
CPC ........ *H04L 1/0063* (2013.01); *G06F 13/1668* (2013.01)

(58) Field of Classification Search
CPC ... H04L 1/0061; H04L 1/0063; H04L 1/0045; H04L 7/042; H04L 7/048; H04L 7/10; H04L 7/041; H04L 2001/0094; H04L 1/1607; H03M 13/098; H03M 13/1575; H03M 13/152; G11C 29/52; G11C 2029/0411; H04J 3/06; G06F 13/3625; G06F 1/12; G06F 13/4068; G06F 11/10; G06F 11/1004; G06F 11/1044; G06F 11/1048; G06F 11/108; G06F 13/1668; G06F 13/4027

See application file for complete search history.

(56) References Cited

U.S. PATENT DOCUMENTS

| | | | | |
|---|---|---|---|---|
| 6,105,119 A * | 8/2000 | Kerr | ................... | G06F 13/4027 710/110 |
| 2008/0046603 A1* | 2/2008 | Kobayashi | ............ | G06F 11/364 710/17 |
| 2013/0322461 A1* | 12/2013 | Poulsen | .................... | H04J 3/02 370/458 |
| 2013/0322462 A1* | 12/2013 | Poulsen | .................... | H04J 3/06 370/458 |
| 2014/0047306 A1* | 2/2014 | Perego | .................... | G06F 11/10 714/799 |
| 2014/0317470 A1* | 10/2014 | Chung | ................ | G06F 11/1076 714/764 |

(Continued)

*Primary Examiner* — Guerrier Merant
(74) *Attorney, Agent, or Firm* — Pearne & Gordon LLP

(57) ABSTRACT

A transfer device includes: a converter configured to convert an address contained in a command CMD1 transmitted from a master device, to an address indicating an internal slave device, and transfer a command CMD2K to the stated internal slave device; a first parity calculator configured to calculate a first parity bit formed of one bit for the command CMD2K; and a judgment circuit configured to judge whether or not a predetermined abort condition is satisfied. When the predetermined abort condition is satisfied, the converter outputs the first parity bit as a parity bit of the command CMD2K.

2 Claims, 2 Drawing Sheets

(56) References Cited

U.S. PATENT DOCUMENTS

| | | | |
|---|---|---|---|
| 2015/0281871 A1* | 10/2015 | Poulsen | H04L 69/08 |
| | | | 370/328 |
| 2017/0255579 A1* | 9/2017 | Ngo | G06F 13/364 |
| 2018/0046595 A1* | 2/2018 | Pitigoi-Aron | G06F 13/4295 |
| 2018/0357121 A1* | 12/2018 | Graif | G06F 11/0793 |

* cited by examiner

TRANSFER DEVICE

TRANSFER DEVICE

This application claims priority from Japanese Patent Application No. 2017-114895 filed on Jun. 12, 2017. The content of this application is incorporated herein by reference in its entirety.

BACKGROUND

The present disclosure relates to transfer devices. As a scheme for interconnecting semiconductor components that are used in a mobile communication terminal such as a cellular phone terminal, a serial transmission scheme represented by the Mobile Industry Processor Interface (MIPI) is well-known. With the serial transmission scheme, requirements for reduction in the number of interconnection wires and for lower power consumption can be met.

However, the number of slave devices that can be connected to a bus connecting a master device and the slave devices is limited in the above-mentioned serial transmission scheme. Because of this, as the number of slave devices connected to the bus increases, not only control of the slave devices by the master device becomes complex but also a load on the bus becomes large, thereby making it difficult to achieve high speed communication.

BRIEF SUMMARY

The present disclosure proposes a transfer device that makes it possible to simplify the control of slave devices by a master device and achieve high speed communication.

In order to solve the above problems, a transfer device according to an embodiment of the present disclosure is a transfer device that transfers a command to which one parity bit is added, and includes (i) a converter configured to convert an address contained in a command transmitted from a master device, to an address included in a single slave device which is a destination of the command and indicating a specific internal slave device among a plurality of internal slave devices, and output a command containing the converted address, and (ii) a judgment circuit configured to judge whether or not a predetermined abort condition is satisfied. In a case the predetermined abort condition is satisfied, the converter outputs a parity bit that causes a parity error to be generated, as a parity bit of the command containing the converted address.

With the transfer device according to the embodiment of the present disclosure, the control of the slave device by the master device can be simplified and high speed communication can be achieved.

Other features, elements, characteristics and advantages of the present disclosure will become more apparent from the following detailed description of embodiments of the present disclosure with reference to the attached drawings.

DETAILED DESCRIPTION

Figure 1:
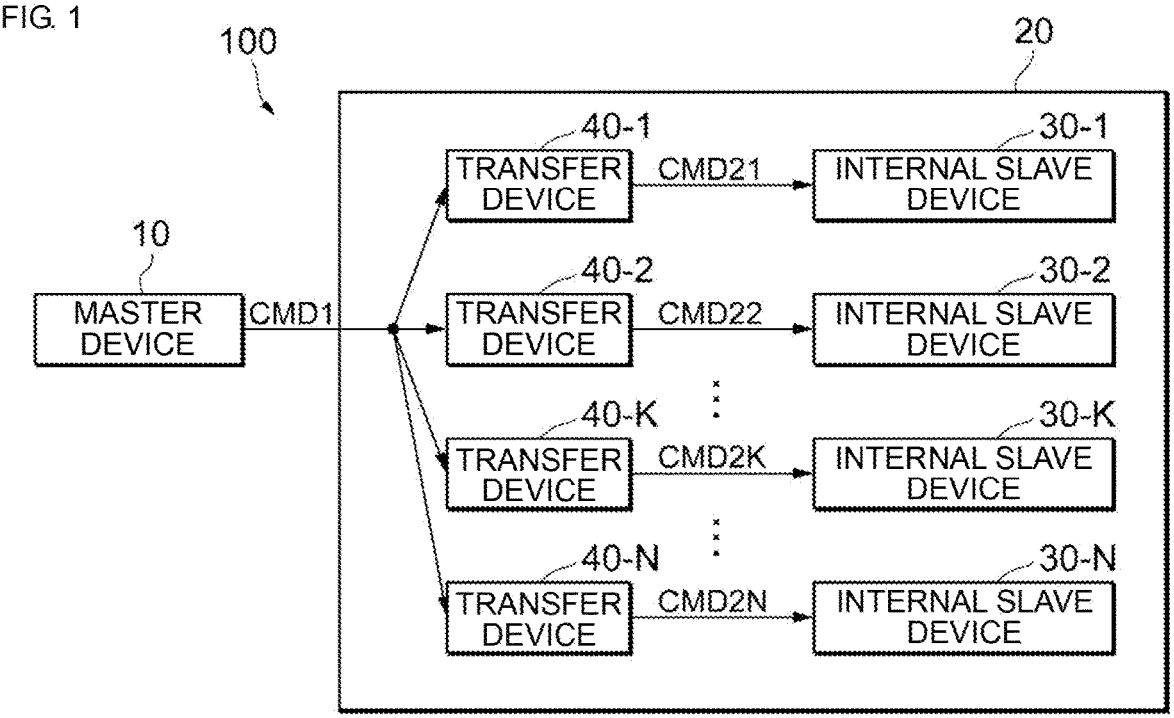
FIG. 1 is a descriptive diagram illustrating a schematic circuit configuration of a wireless communication circuit according to an embodiment of the present disclosure.

Hereinafter, embodiments of the present disclosure will be described with reference to the drawings. Here, identical reference numerals denote the same circuit elements and redundant descriptions thereof will be omitted.

FIG. 1 is a descriptive diagram illustrating a schematic circuit configuration of a wireless communication circuit 100 according to an embodiment of the present disclosure. The wireless communication circuit 100 is a circuit configured to perform processing of transmission/reception of a Radio Frequency (RF) signal in a mobile communication terminal such as a cellular phone terminal, for example, and includes a master device 10 and a slave device 20. The master device 10 is a device having the right to control processing associated with data transfer (e.g. a baseband integrated Circuit (IC) or a Radio Frequency Integrated Circuit (RE IC)). The slave device 20 is a device configured to carry out processing associated with data transfer in response to a request from the master device 10 (e.g. a power amplification module, front-end module, or switching element).

Figure 2:
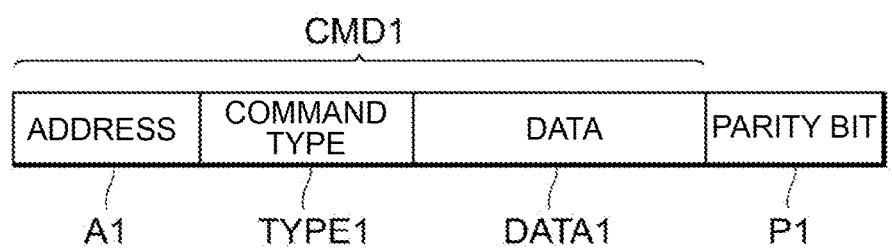
FIG. 2 is a descriptive diagram of a command according to the embodiment of the present disclosure.

The master device 10 specifies an address of the slave device 20 using a command CMD1, and outputs an instruction thereto to perform the processing associated with data transfer. As shown in FIG. 2, the command CMD1 contains an address A1, a command type TYPE1, and data DATA1; and a parity bit P1 formed of one bit is added to the command CMD1. The address A1 indicates identification information for specifying the address of the slave device 20 which is a destination of the command CMD1. The command type TYPE1 indicates contents of the command (e.g. reading/writing of data). The data DATA1 indicates information associated with data transfer (e.g. write-data). The parity bit P1 is calculated by an odd parity scheme or an even parity scheme. In the odd parity scheme, a bit value of the parity bit P1 is calculated so that the number of "1" bits included in a bit row formed of the command CMD1 and the parity bit P1 takes an odd number. In the even parity scheme, the bit value of the parity bit P1 is calculated so that the number of "1" bits included in the bit row formed of the command CMD1 and the parity bit P1 takes an even number.

The slave device 20 includes a plurality of internal slave devices 30-1, 30-2, . . . , and so on up to 30-N, and a plurality of transfer devices 40-1, 40-2, . . . , and so on up to 40-N. Here, N is an integer equal to or more than two. Each of the internal slave devices 30-1, 30-2, . . . , and so on up to 30-N plays at least part of functions of the slave device 20. The internal slave devices 30-1, 30-2, . . . , and so on up to 30-N are not recognized by the mater device 10, and addresses thereof are not directly specified by the master device 10.

Figure 3:
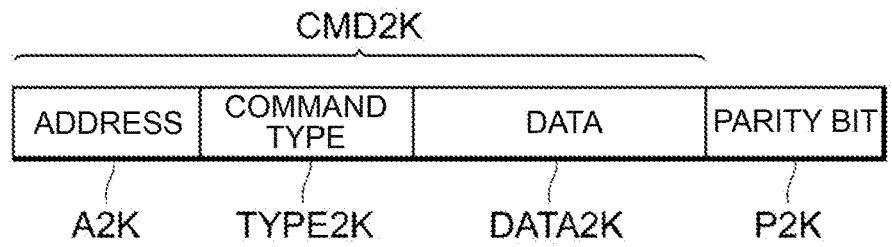
FIG. 3 is also a descriptive diagram of a command according to the embodiment of the present disclosure.

A transfer device 40-K transfers a command to a specific internal slave device 30-K among the plurality of internal slave devices 30-1, 30-2, . . . , and so on up to 30-N. Here, K is an integer no less than one and no more than N. The transfer device 40-K converts the command CMD1 to a command CMD2K, and transfers the command CMD2K to the specific internal slave device 30-K. As shown in FIG. 3, the command CMD2K contains an address A2K, a command type TYPE2K, and data DATA2K; and a Parity bit P2K formed of one bit is added to the command CMD2K. The address A2K indicates identification information for specifying an address of the specific internal slave device 30-K. The parity bit P2K is calculated by the odd parity scheme or the even parity scheme. In the odd parity scheme, a bit value of the parity bit P2K is calculated so that the number of "1" bits included in a bit row formed of the command CMD2K and the parity bit P2K takes an odd number. In the even parity scheme, the bit value of the parity bit P2K is calculated so that the number of "1" bits included in the bit row formed of the command CMD2K and the parity bit P2K takes an even number. The command type TYPE2K and the data DATA2K may be the same as the command type TYPE1 and the data DATA1 respectively or may be so converted as to be different from the command type TYPE1 and the data DATA1 as needed.

With the above-discussed configuration, in response to the request from the master device 10, the command CMD1 to be processed by the slave device 20 is processed by one of the plurality of internal slave devices 30-1, 30-2, . . . , and so on up to 30-N. This makes it possible for the plurality of internal slave devices 30-1, 30-2, . . . , and so on up to 30-N to be seen as a single slave device 20 in a pseudo manner.

Figure 4:
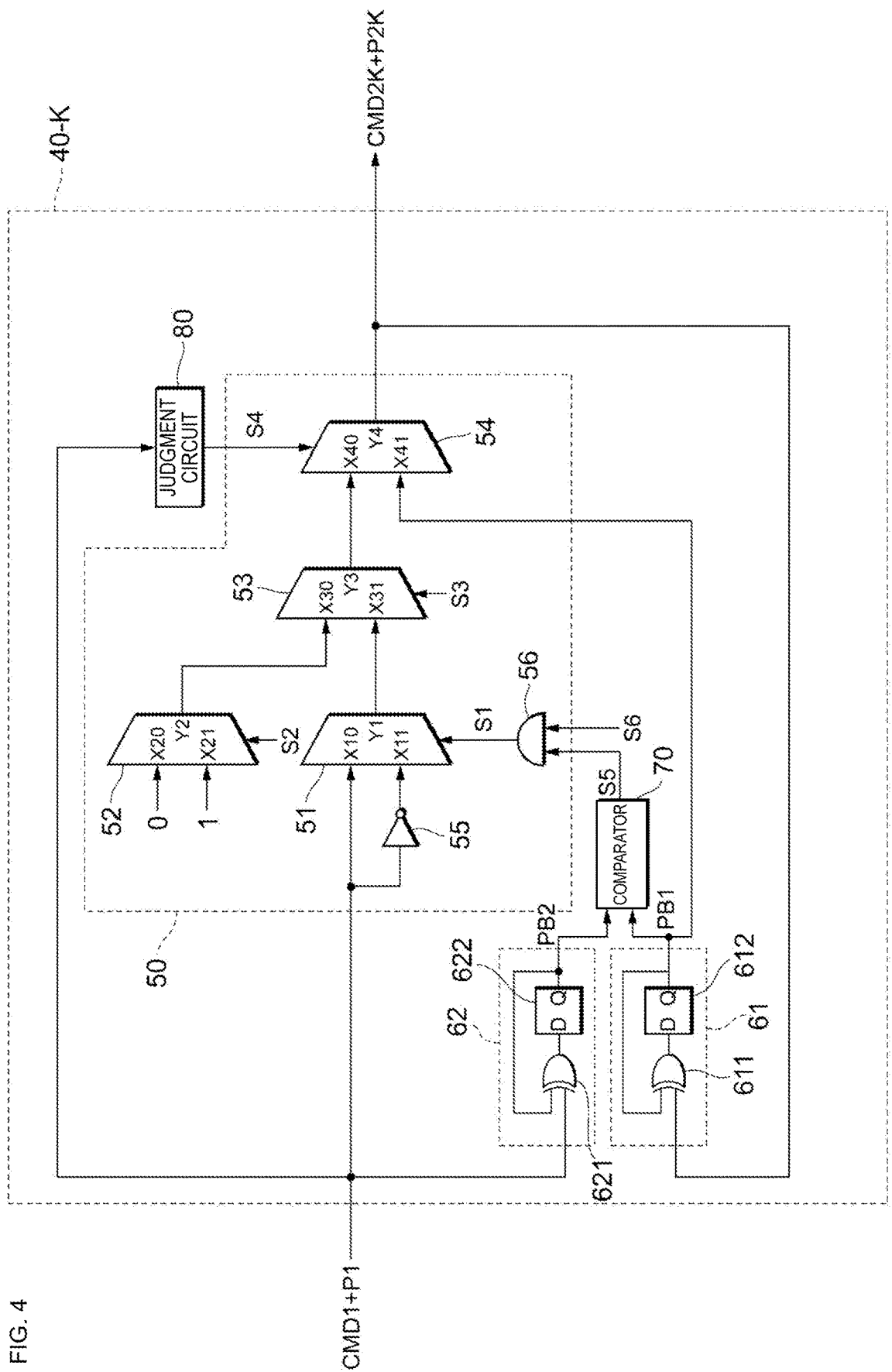
FIG. 4 is a descriptive diagram illustrating a schematic circuit configuration of a transfer device according to the embodiment of the present disclosure.

Next, a schematic circuit configuration of the transfer device 40-K will be described with reference to FIG. 4. The transfer device 40-K includes a converter 50, parity calculators 61 and 62, a comparator 70, and a judgment circuit 80. The converter 50 converts the address A1 contained in the command CMD1 transmitted from the master device 10, to the address A2K specifying the specific internal slave device 30-K, and transfers the command CMD2K, after the address A1 having been converted, to the specific internal slave device 30-K. The converter 50 may convert not only the address A1 but also the command type TYPE1 or the data DATA1 at the time when the converter 50 converts the command CMD1 to the command CMD2K. The converter 50 converts the command CMD1 to the command CMD2K from the leading bit of the command CMD1 in sequence on a bit-by-bit basis without necessarily buffering the command CMD1. The processing to convert the command CMD1 to the command CMD2K includes processing in which each bit value of the command CMD1 is not inverted or processing in which each bit value thereof is converted to "0" or "1".

The converter 50 includes multiplexers 51, 52, 53, and 54, a NOT gate 55, and an AND gate 56. The multiplexer 51 selects one of bit values inputted to inputs X10 and X11 in accordance with a selection control signal S1, and outputs the selected bit value on the bit-by-bit basis from an output Y1. Bit values of the command CMD1 and the parity bit P1 are inputted, without necessarily being inverted, to the input X10. The bit values of the command CMD1 and the parity bit P1 are inverted through the NOT gate 55, and the inverted bit values are inputted to the input X11. In a period during which the command CMD1 from the leading bit to the tailing bit thereof is inputted to the converter 50, the selection control signal S1 instructs the multiplexer 51 to output, from the output Y1, the command CMD1 inputted to the input X10. Meanwhile, at a timing at which the parity bit P1 is inputted to the converter 50, the selection control signal S1 instructs the multiplexer 51 to output, from the output Y1, a not-inverted signal of the parity bit P1 inputted to the input X10 or an inverted signal of the parity bit P1 inputted to the input X11, as the parity bit P2K. The selection control signal S1 is generated from selection control signals S5 and S6. Details of the selection control signals S5 and S6 will be explained later.

The multiplexer 52 selects one of bit values inputted to inputs X20 and X21 in accordance with a selection control signal S2, and outputs the selected bit value on the bit-by-bit basis from an output Y2. To the input X20, "0" is inputted. To the input X21, "1" is inputted. The multiplexer 53 selects one of bit values inputted to inputs X30 and X31 in accordance with a selection control signal S3, and outputs the selected bit value on the bit-by-bit basis from an output Y3. The bit value outputted from the output Y2 is inputted to the input X30. The bit value outputted from the output Y1 is inputted to the input X31. The selection control signals S2 and S3 respectively output instructions to the multiplexers 52 and 53 so that the conversion from the command CMD1 to the command CMD2K is carried out from the leading bit of the command CMD1 in sequence on the bit-by-bit basis.

The parity calculator 61 calculates a parity bit PB1 formed of one bit for the command CMD2K after the address A1 having been converted. For the sake of convenience in explanation, the parity bit PB1 calculated by the parity calculator 61 is referred to as a first parity bit PB1. The parity calculator 61 includes an EXOR gate 611 and a D flip-flop 612. A bit value outputted from an output Y4 is inputted to one of two inputs of the EXOR gate 611. A bit value outputted from an output Q of the D flip-flop 612 is inputted to the other of the two inputs of the EXOR gate 611. A bit value outputted from the EXOR gate 611 is inputted to an input D of the D flip-flop 612. In the odd parity scheme, an initial value of the D flip-flop 612 is 0, for example. The parity calculator 62 calculates a parity bit PB2 formed of one bit for the command CMD1 before the address A1 being converted. For the sake of convenience in explanation, the parity bit PB2 calculated by the parity calculator 62 is referred to as a second parity bit PB2. The parity calculator 62 includes an EXOR gate 621 and a D flip-flop 622. Each of the bit values of the command CMD1 is inputted to one of two inputs of the EXOR gate 621. A bit value outputted from an output Q of the D flip-flop 622 is inputted to the other of the two inputs of the EXOR gate 621. A bit value outputted from the EXOR gate 621 is inputted to an input D of the D flip-flop 622. In the odd parity scheme, an initial value of the D flip-flop 622 is 0, for example. When the parity calculator 61 and the parity calculator 62 are distinguished from each other, the parity calculator 61 is referred to as a first parity calculator 61 while the parity calculator 62 is referred to as a second parity calculator 62.

The comparator 70 compares the first parity bit PB1 with the second parity bit PB2, and outputs the selection control signal S5 for instructing the multiplexer 51 to perform conversion from the parity bit P1 to the parity bit P2K in accordance with the comparison result telling whether or not the first parity bit PB1 matches the second parity bit PB2. In the case where the first parity bit PB1 matches the second parity bit PB2, the selection control signal S5 instructs the multiplexer 51 to output a parity bit obtained by not inverting the parity bit P1 (the bit value inputted to the input X10) as the parity bit P2K. On the other hand, in the case where the first parity bit PB1 does not match the second parity bit PB2, the selection control signal S5 instructs the multiplexer 51 to output a parity bit obtained by inverting the parity bit P1 (the bit value inputted to the input X11) as the parity bit P2K. The selection control signal S6 becomes "0" in a period during which the command CMD1 from the leading bit to the tailing bit thereof is inputted to the converter 50 and becomes "1" at a timing at which the parity bit P1 is inputted to the converter 50, for example. The selection control signals S5 and S6 are inputted to the AND gate 56, and the AND gate 56 supplies a logical product of the selection control signals S5 and S6 as the selection control signal S1 to the multiplexer 51. As described above, the parity bit P2K can reflect a bit error generated in the command CMD1 by changing the manner of scheme of conversion from the parity bit P1 to the parity bit P2K in accordance with whether or not the first parity bit PB1 matches the second parity bit PB2. For example, when a parity error is generated in the command CMD1 due to the influence of noise, the parity bit P2K can correctly reflect such a parity error.

The multiplexer 54 selects one of bit values inputted to inputs X40 and X41 in accordance with a selection control signal S4, and outputs the selected bit value on the bit-by-bit basis from the output Y4. The bit value outputted from the output Y3 is inputted to the input X40. The first parity bit PB1 is inputted to the input X41.

The internal slave device 30-K executes the command CMD2K when all the following conditions (a) through (c) are satisfied.
  (a) The address A1 specifies the slave device 20.
  (b) The command CMD1 is a valid command for the internal slave device 30-K.
  (c) No parity error is generated in the command CMD1.

The judgment circuit 80 judges whether or not a predetermined abort condition is satisfied based on the command CMD1. The abort condition refers to a condition that interrupts the execution of the command CMD2K, and specifically refers to a case in which the above-described condition (a) or (b) is not satisfied. The converter 50 converts the command CMD1 to the command CMD2K from the leading bit of the command CMD1 in sequence on the bit-by-bit basis without necessarily buffering the command CMD1. Because of this, until a stage in which the conversion processing of the command CMD1 has progressed to some extent, whether or not the command CMD1 is a valid command for the internal slave device 30-K cannot be judged. For example, whether or not the condition (a) is satisfied cannot be judged until a stage in which all the bit values of the address A1 have been checked. When the abort condition is satisfied, the judgment circuit 80 instructs the multiplexer 54 to perform processing for making the command CMD2K invalid through the selection control signal S4. That is, when the abort condition is satisfied, the selection control signal S4 instructs the multiplexer 54 to output, from the output Y4, the first parity bit PB1 inputted to the input X41 of the multiplexer 54 as the parity bit P2K. Because the bit value of the first parity bit PB1 is a bit value obtained by inverting a correct parity bit, the first parity bit PB1 functions as a parity bit to cause a parity error. This makes it possible to intentionally cause a parity error to be generated in the command CMD2K and cause the command CMD2K to be invalid. As discussed above, in the case where the abort condition is satisfied, by causing the parity error to be generated on purpose, of the plurality of internal slave devices 30-1, 30-2, . . . , and so on up to 30-N, only the internal slave device to respond to the command CMD2K can be made to respond to the command CMD2K. Note that, in the case where the predetermined abort condition is satisfied, as long as the converter 50 can output a parity bit causing a parity error to be generated as the parity bit of the command CMD2K, the circuit configurations of the parity calculators 61 and 62 are not limited to the circuit configuration shown in FIG. 4 and can be modified in various manners. On the other hand, when the abort condition is not satisfied, the selection control signal S4 instructs the multiplexer 54 to output, from the output Y4, the parity bit P2K, as is, that is inputted to the input X40 of the multiplexer 54 from the output Y1 passing through the multiplexer 53.

According to the present embodiment, because the plurality of internal slave devices 30-1, 30-2, . . . , and so on up to 30-N can be seen as the single slave device 20 in a pseudo manner, the control of the slave device 20 by the master device 10 can be simplified, thereby making it possible to achieve high speed communication.

The above-discussed embodiments are intended to facilitate the understanding of the present disclosure, and are not intended to limit the interpretation of the present disclosure. The embodiments of the present disclosure can be modified/improved without necessarily departing from the scope and spirit of the disclosure, and equivalents obtained through such modification/improvement are also included in the present disclosure. In other words, configurations obtained by appropriately changing the design of the embodiments carried out by those skilled in the art, are also included in the scope of the present disclosure as long as the stated configurations include any feature of the present disclosure. For example, the elements included in the embodiments, and arrangement, materials, conditions, shapes, sizes and the like of the stated elements are not limited to the examples described above, and can be appropriately changed. In addition, the elements included in the embodiments can be combined with each other as long as the combination is technically possible, and configurations obtained by combining such elements are also included in the scope of the present disclosure as long as the stated configurations include any feature of the present disclosure.

While embodiments of the disclosure have been described above, it is to be understood that variations and modifications will be apparent to those skilled in the art without necessarily departing from the scope and spirit of the disclosure. The scope of the disclosure, therefore, is to be determined solely by the following claims.

What is claimed is:

1. A transfer device of a slave device, the transfer device being configured to receive a first command to which one parity bit is added, the slave device being a destination of the first command transmitted from a master device, and the transfer device being configured to transmit a transfer command to one of a plurality of internal slave devices of the slave device, the transfer device comprising:
  a converter configured to convert an address of the slave device included in the first command to an address indicating a specific internal slave device among the plurality of internal slave devices, and to output the transfer command, the transfer command including the converted address;
  a judgment circuit configured to determine whether or not a predetermined abort condition is satisfied,
  wherein, when the predetermined abort condition is satisfied, the converter is configured to output, as a parity bit of the transfer command, a bit value that causes a parity error to be generated;
  a first parity calculator configured to calculate a first parity bit for the transfer command; and
  a second parity calculator configured to calculate a second parity bit for the first command,
    wherein, when the first parity bit matches the second parity bit and the predetermined abort condition is not satisfied, the converter is configured to output, as the parity bit of the transfer command, a bit value obtained by not inverting the one parity bit added to the first command, and
    wherein, when the first parity bit does not match the second parity bit and the predetermined abort condition is not satisfied, the converter is configured to output, as the parity bit of the transfer command, a parity bit value obtained by inverting the one parity bit added to the first command.

2. A control system configured to transfer a first command to which one parity bit is added, the control system comprising:
a converter configured to convert an address included in the first command to an address indicating a specific internal slave device among a plurality of internal slave devices, and to output a transfer command, the transfer command including the converted address;
a judgment circuit configured to determine whether or not a predetermined abort condition is satisfied,
wherein the first command is transmitted from a master device, and the address included in the first command is a destination address of the first command,
wherein, when the predetermined abort condition is satisfied, the converter is configured to output, as a parity bit of the transfer command, a bit value that causes a parity error to be generated;
a first parity calculator configured to calculate a first parity bit for the transfer command; and
a second parity calculator configured to calculate a second parity bit for the first command,
wherein, when the first parity bit matches the second parity bit and the predetermined abort condition is not satisfied, the converter is configured to output, as the parity bit of the transfer command, a parity bit value obtained by not inverting the one parity bit added to the first command, and
wherein, when the first parity bit does not match the second parity bit and the predetermined abort condition is not satisfied, the converter is configured to output, as the parity bit of the transfer command, a parity bit value obtained by inverting the one parity bit added to the first command.

* * * * *

UNITED STATES PATENT AND TRADEMARK OFFICE
CERTIFICATE OF CORRECTION

PATENT NO. : 10,567,117 B2
APPLICATION NO. : 16/003453
DATED : February 18, 2020
INVENTOR(S) : Yuji Shintomi It is certified that error appears in the above-identified patent and that said Letters Patent is hereby corrected as shown below:

In the Specification

Column 2, Line 22, "Circuit (RE IC)). The" should read -- Circuit (RF IC)). The --

Column 2, Line 64, "and a Parity bit" should read -- and a partity bit --

Signed and Sealed this
Seventeenth Day of November, 2020

Andrei Iancu
*Director of the United States Patent and Trademark Office*